United States Patent
Lewis

(10) Patent No.: US 10,928,546 B2
(45) Date of Patent: Feb. 23, 2021

(54) OPTIC FIBRE SENSING

(71) Applicant: OPTASENSE HOLDINGS LIMITED, Farnborough (GB)

(72) Inventor: Andrew Lewis, Farnborough (GB)

(73) Assignee: OPTASENSE HOLDINGS LIMITED, Hampshire (GB)

( * ) Notice: Subject to any disclaimer, the term of this patent is extended or adjusted under 35 U.S.C. 154(b) by 152 days.

(21) Appl. No.: 15/532,202

(22) PCT Filed: Feb. 5, 2016

(86) PCT No.: PCT/GB2016/050274
§ 371 (c)(1),
(2) Date: Jun. 1, 2017

(87) PCT Pub. No.: WO2016/124944
PCT Pub. Date: Aug. 11, 2016

(65) Prior Publication Data
US 2018/0267201 A1    Sep. 20, 2018

(30) Foreign Application Priority Data

Feb. 6, 2015    (GB) ...................................... 1502025

(51) Int. Cl.
*G01V 8/16*    (2006.01)
*G01H 9/00*    (2006.01)
(Continued)

(52) U.S. Cl.
CPC ................ *G01V 8/16* (2013.01); *B61L 1/166* (2013.01); *B61L 1/20* (2013.01); *B61L 27/0094* (2013.01);
(Continued)

(58) Field of Classification Search
CPC .................................. G01V 8/16; B61L 1/166
See application file for complete search history.

(56) References Cited

U.S. PATENT DOCUMENTS 5,355,208 A    10/1994    Crawford et al.
6,980,108 B1    12/2005    Gebbia et al.
(Continued)

FOREIGN PATENT DOCUMENTS

CN    103123739    5/2013
DE    102012002359    1/2013
(Continued)

OTHER PUBLICATIONS

Australian Government, IP Australia, Examination Report No. 1 dated Jun. 10, 2020, in connection with Australian Patent Application No. 2016214137, 4 pages.
(Continued)

*Primary Examiner* — Clayton E. LaBalle
*Assistant Examiner* — Dennis Hancock
(74) *Attorney, Agent, or Firm* — McDonnell Boehnen Hulbert & Berghoff LLP

(57) ABSTRACT

A fibre sensing apparatus (100) comprises an interrogation unit (104) to interrogate a sensing fibre with optical radiation, and to detect an optical signal returned from the fibre, and processing circuitry (114). A portion of the fibre may be excited with a test signal. The processing circuitry comprises an assessment module (115) to analyse the optical signal returned from the excited portion of fibre, and to determine at least one operational characteristic of the apparatus based on the detected optical signal.

25 Claims, 2 Drawing Sheets

(51) Int. Cl.
  *G01V 13/00* (2006.01)
  *B61L 1/16* (2006.01)
  *B61L 1/20* (2006.01)
  *B61L 27/00* (2006.01)
  *G01D 5/26* (2006.01)
(52) U.S. Cl.
  CPC ............. *G01D 5/268* (2013.01); *G01H 9/004* (2013.01); *G01V 13/00* (2013.01)

(56) References Cited

U.S. PATENT DOCUMENTS

| | | | | |
|---|---|---|---|---|
| 2012/0057432 | A1* | 3/2012 | Hill | E21B 47/16 367/81 |
| 2014/0150523 | A1* | 6/2014 | Stokely | E21B 47/123 73/1.82 |
| 2014/0208821 | A1* | 7/2014 | Jaaskelainen | G01V 13/00 73/1.15 |
| 2014/0362668 | A1* | 12/2014 | McEwen-King | G01S 1/74 367/118 |
| 2015/0000415 | A1* | 1/2015 | Kelley | B61L 5/12 73/649 |
| 2015/0013465 | A1* | 1/2015 | Godfrey | B61L 23/044 73/655 |

FOREIGN PATENT DOCUMENTS

| | | |
|---|---|---|
| GB | 2442745 | 4/2008 |
| GB | 2506001 | 3/2014 |
| JP | H0688737 A | 3/1994 |
| JP | H09-329415 | 12/1997 |
| JP | H11160329 | 6/1999 |
| JP | 2001-041847 | 2/2001 |
| JP | 2003014418 | 1/2003 |
| JP | 2003-344147 | 12/2003 |
| JP | 2007-187613 | 7/2007 |
| JP | 2015500483 | 1/2015 |
| WO | WO 94/00732 | 1/1994 |
| WO | WO 2013/114135 | 8/2013 |
| WO | WO 2013/120162 | 8/2013 |
| WO | WO 2015/020642 | 2/2015 |

OTHER PUBLICATIONS

Japanese Patent Office, Office Action dated Sep. 23, 2020, issued in Japanese Application No. 2017-540753, 10 pages (with English Translation).

* cited by examiner

OPTIC FIBRE SENSING

FIELD OF THE INVENTION

The present invention relates to optical fibre sensing apparatus and methods.

BACKGROUND OF THE INVENTION

Fibre optic sensors may be used in a range of applications, for example geophysical applications (in place of or alongside geophones or hydrophones), security applications (such as perimeter security) and monitoring applications. One example of a monitoring function is to monitor infrastructure including monitoring complex systems such as railways. Fibre optic sensors can be used to detect the presence and location of trains or other moving assets on a track, for example. In addition, such sensors can provide asset condition monitoring, for example determined if a signature frequency produced by an asset matches a 'normal' frequency. The sensors can also provide more general infrastructure monitoring, for example monitoring for rock fall, landslip, tunnel and bridge collapse scenarios and monitoring authorised and unauthorised movement (i.e. 'listening' for authorised personal on the track, or for trespassers).

Distributed acoustic sensing (DAS) employs a length of longitudinal fibre which is optically interrogated to provide sensing of acoustic/vibrational activity along its length. The length of fibre is typically single mode fibre, and is usually free of any mirrors, reflectors, gratings, or change of optical properties along its length. In order to interpret the received signal, the length of the fibre is divided into a plurality of channels for processing purposes.

In distributed acoustic sensing, the phenomenon of Rayleigh backscattering may be utilised. Due to random inhomogeneities in standard optical fibres, a small amount of light from a pulse injected into a fibre is reflected back from numerous locations along the length of the fibre, resulting in a continuous return signal in response to a single input pulse. If a disturbance occurs along the fibre, it changes the backscattered light at that point. This change can be detected at a receiver and from it the source disturbance signal can be characterised.

Acoustic sensing arrangements may operate with a longitudinal fibre for example around 40 km in length, and may be capable of resolving sensed data into around 10 m lengths (based on the time at which the return signal is detected). In such examples, each 10 m length may be interrogated to provide real time data along the length of the fibre.

Since the fibre has no discontinuities, the length and arrangement of fibre sections corresponding to each channel is determined by the interrogation of the fibre. These can be selected according to the physical arrangement of the fibre and, where applicable, the asset it is monitoring, and also according to the type of monitoring required. The length of each fibre section (i.e. the channel resolution) can be varied by adjusting operational parameters of sensing apparatus such as the input pulse width and duty cycle, without any changes to the fibre.

Distributed sensing is able to provide long range, high resolution, high sensitivity monitoring.

Other fibre sensing techniques include Brillouin based sensing, fibre Bragg grating based sensing (in which a fibre is modified to including spaced fibre Bragg grating) and heterodyne interferometry (in which light which has passed through a given section of fibre is interfered with light that has not, and the mutual phase difference is monitored).

SUMMARY OF THE INVENTION

There is described herein fibre sensing apparatus comprising:
a sensing fibre;
an actuator to excite a portion of the fibre with an acoustic test signal;
an interrogation unit to interrogate the sensing fibre with optical radiation, and to detect an optical signal returned from the fibre, and
processing circuitry comprising an assessment module to analyse an optical signal returned from the excited portion of fibre, and to determine at least one operational characteristic of the apparatus based on the signal.

In one example, the assessment module may be arranged to assess whether a signal indicative of an acoustic disturbance is returned from the excited portion. As the fibre portion has been excited, it can be assumed that a signal showing an acoustic disturbance should be present. The absence of such a signal is therefore indicative that the apparatus is not functioning as expected. This may be because a fibre has been broken, or that a detector and/or source of optical radiation is not functioning. In such examples, the apparatus effectively carries out an integrity monitoring on itself. In such cases, the operational characteristic may be an indication that the apparatus is functional or non-functional.

In some examples, the assessment module may be arranged to assess the returned signal to carry out a form of 'quality assurance' on apparatus performance. In such examples, the operational characteristic may be indicative of the sensitivity of the system. In such an example, the actuator test signal may be arranged to test a predetermined operational range of the apparatus. In one example, the actuator test signal may have at least one attribute (frequency, amplitude, characteristic variations in frequency and/or amplitude, or the like) of an anticipated signal, i.e. an acoustic signal which the apparatus is expected to receive and/or detect. If such a test signal is correctly detected, the operator may be confident that the anticipated signal on which it is based, if incident on the fibre, will also be detected.

Alternatively or additionally, the assessment module may be arranged to assess the calibration of the apparatus. The assessment module may for example be arranged to analyse the signal detected and, based on the analysis, optimize interrogation unit performance over one or more operational range. For example, the interrogation unit and/or processing circuitry may vary operational parameters of the interrogation unit (pulse frequency, pulse separation, sampling frequency, length of sensing channel, signal decoding algorithms, etc.) until the actuator test signal is decoded as desired/expected.

Such an apparatus has an advantage in that it can be readily tested to ensure it is functioning, or functioning to a desired standard or in a desired manner.

In one example, the assessment module may be arranged to compare at least one characteristic of the detected signal from the excited portion to at least one predetermined characteristic.

In some examples, the assessment module may be arranged to hold or receive one or more signature(s) characterising at least one signal or signal type. Such signature(s)

may comprise a representation of the signal, and/or one or more characteristic of a signal. If the assessment module is not able to recognise a detected test signal designed to test a particular operational characteristic as corresponding to a signal signature, this may be indicative that operational parameters should be changed and/or that the apparatus is not functioning to correctly monitor the anticipated signal. If however, a signal corresponding to a signal signature is detected in other circumstances (e.g. in another portion of the fibre, or while a test signal is not being applied), then this may be used to generate an alert.

The assessment module may be arranged to compare at least one characteristic of a detected test signal (or other signal) to the signature(s) to determine the signal type and/or the accuracy or sensitivity of its detection. For example, the detected optical signal may be compared to an expected signal derived analytically from the actuator test signal, or one or more characteristics may be derived from the actuator test signal and compared to characteristic(s) derived from the detected optical signal.

If a test signal is not detected, or the detected test signal does not meet predetermined parameters (in some examples, following at least one attempt at recalibration), this may be indicative of a fault or sub-optimal operation of the monitoring apparatus.

The assessment module may be arranged to produce an output indicative of an operational characteristic. The processing circuitry may further comprise an alert module. In such an example, if the assessment module indicates that one or more operational characteristics do/does not meet a predetermined standard, the alert module may produce an alert. The alert may comprise an alarm, or a visual indication of a failure to detect the test signal.

Alternatively or additionally, the alert module may be arranged to provide a signal which may cause other apparatus or system to enter a failsafe mode. For example, in the context of safety critical monitoring, if the apparatus cannot be relied upon, or cannot be relied upon in an appropriate operational range, this is important information which may for example trigger a failsafe mode of operation in the monitored system to ensure that any limitations in the apparatus do not result in undue safety risks.

In such examples, the absence of an alert provides confidence that the fibre sensing apparatus is capable, in use, of performing a monitoring function.

In one embodiment the actuator may comprise an acoustic source, for instance a hammer or thumper device. This may be arranged to act on the ground, for instance to excite the ground in the vicinity of a buried fibre. Where a fibre is attached to, or deployed near, a structure, such as a linear asset (e.g. a rail of a rail track, a pipeline, or the like), the actuator may act on or near the structure. The actuator may be a vibrational acoustic source, capable of supplying repeated acoustic impulses. The output of the actuator may be controlled to produce a test signal having desired characteristics.

In one example, the interrogation unit is arranged to carry out sensing in relation to other channels (i.e. for portions of fibre which are different to or spaced from the portion of fibre excited by the actuator test signal) during the test period. This allows a high degree of confidence that, if the actuator test signal is detected (and/or is detected correctly), the apparatus is functioning as expected. Of course, such monitoring could be carried out at other times. The test period may be prolonged, for example continuous or substantially continuous.

The apparatus may comprise a Distributed Acoustic Sensor (DAS). DAS provides a flexible fibre sensing apparatus, in which the operational parameters may be readily varied.

A second aspect of the invention provides a method of assessing at least one operation characteristic of a sensing apparatus comprising:
  interrogating the optical fibre with optical radiation and detecting optical radiation returned from a portion of the optical fibre which is excited with a test signal,
  analysing the detected optical radiation to determine at least one operational characteristic of the sensing apparatus.

In one example, the test signal has one or more known characteristics and the step of analysing may comprise determining if the detected optical signal is indicative of an acoustic signal having at least one known characteristic of the test signal.

Another aspect of the invention provides a fibre sensing apparatus comprising:
  an interrogation unit to interrogate the sensing fibre with optical radiation, and to detect an optical signal returned from the fibre, and
  processing circuitry comprising an assessment module to analyse the optical signal returned from a portion of the fibre which is excited with a test signal, and to determine at least one operational characteristic of the apparatus based on the detected optical signal.

Another aspect of the invention is the use of an optical signal returned from a portion of a sensing fibre which is excited with a test signal to determine at least one operational characteristic of a sensing apparatus.

The invention extends to methods, apparatus and/or use substantially as herein described with reference to the accompanying drawings. Any feature in one aspect of the invention may be applied to other aspects of the invention, in any appropriate combination. In particular, method aspects may be applied to apparatus aspects, and vice versa. Furthermore, features implemented in hardware may generally be implemented in software for example executed by processing circuitry, and vice versa. Any reference to software and hardware features herein should be construed accordingly.

DESCRIPTION OF THE DRAWINGS

Preferred features of the present invention will now be described, purely by way of example, with reference to the accompanying drawings, in which.

DESCRIPTION OF THE INVENTION

Figure 1:
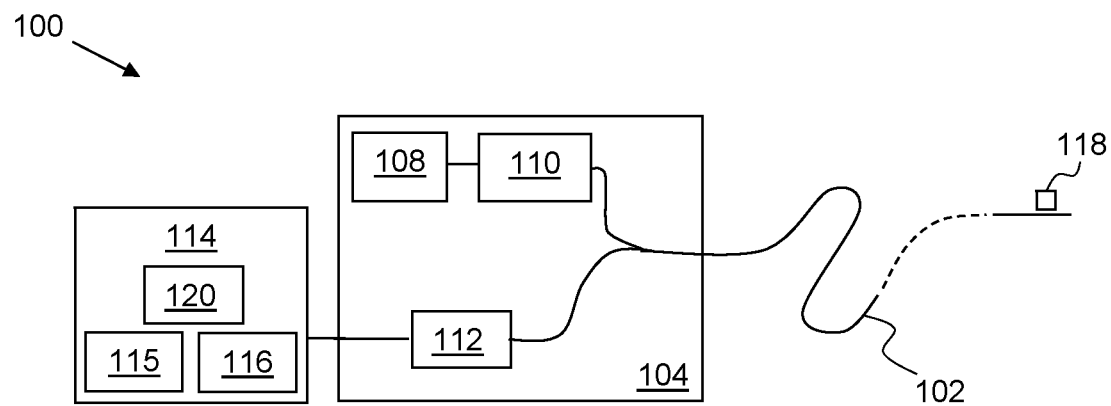
FIG. 1 shows an overview of a system according to one embodiment of the present invention.

Referring to FIG. 1, sensing apparatus 100 comprising an elongate length of standard single mode optical fibre 102 is connected to a distributed acoustic sensing (DAS) interrogation unit 104. The optical fibre 102 may be located along any path which it is desired to monitor, e.g. along a perimeter such as a border and fence line (buried or on the surface) or along linear assets such as pipelines, cable runs, roads or train tracks for example. The path need not be straight.

The interrogation unit 104 is adapted to launch light into the fibre 102 and detect light returned from the fibre 102 in such a way as to provide distributed sensing along the length of the fibre 102. In the present example, the unit 104 is substantially as described in GB 2442745, and uses Optical Time Domain Reflectometry (OTDR) to provide simultaneous independent sensing capability of approximately 4000 adjacent sensing 'bins' 10 m in length. As described in GB2442745, the phenomenon of Rayleigh backscattering results in some fraction of the light input into the fibre being reflected back to the interrogation unit 104, where it is detected to provide an output optical signal which is representative of acoustic disturbances in the vicinity of the fibre 102. The interrogation unit 104 therefore conveniently comprises at least one laser 108 and at least one optical modulator 110 for producing a plurality of optical pulses separated by a known optical frequency difference. The interrogation unit 104 also comprises at least one photodetector 112 arranged to detect radiation which is Rayleigh backscattered from the intrinsic scattering sites within the fibre 102.

Other Rayleigh backscatter DAS sensor interrogation schemes are known and could also be used in carrying out embodiments of the invention. In addition, schemes based on Brillouin or Raman scattering are also known and could be used in embodiments of the invention, as could schemes based on heterodyne interferometry.

The photodetector 112 is arranged to pass a signal indicative of the detected optical signal to processing circuitry 114. The processing circuitry 114 is capable of analysing the signal, as set out below, and comprises an assessment module 115 having an output to an alert module 116. The processing circuitry 114 comprises a memory 120. The memory 120 is arranged to hold signatures of signals to be compared to the detected signals.

The processing circuitry 114 may be co-located with the interrogation unit 104 or may be remote therefrom, and may comprise a user interface/graphical display, which in practice may be realised by an appropriately specified PC. Any user interface may be co-located with the processing circuitry 114 or may be remote therefrom.

An actuator 118 is provided towards the far end of the fibre 102 to the interrogation unit 104 (although it will be appreciated that, in practice, the fibre 102 may double back and the far end of the fibre 102 may be physically close to the interrogation unit 104). The actuator 118 comprises a movable member, capable of acting in the vicinity of the fibre 102 to acoustically excite a portion thereof. While the actuator 118 could be positioned elsewhere on a fibre 102, any portion of fibre 102 optically beyond the actuator 118 will not be tested by operation of the actuator 118, and therefore it may be preferred to place the actuator towards the end of the fibre 102.

Figure 2:
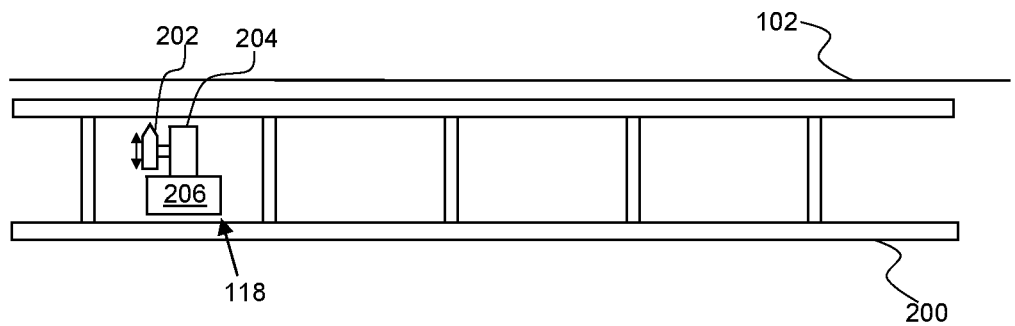
FIG. 2 shows an example of an actuator arranged to act on a train track.

FIG. 2 shows an example of a fibre 102 arranged in situ along a train track 200. In this example, the actuator 118 comprises a metal hammer 202 mounted in an electromagnetic controller 204 such that it can be controlled to strike the track 200 in a manner controlled by a processor 206. In this example, the actuator 118 is capable of producing vibrations in the region of 100 Hz to 1 kHz.

In other examples, the actuator may comprise an alternative electromagnetic actuator, a piezoelectric element, a motor element (for example a micro DC motor) or the like. In some examples, an actuator may be arranged as a 'fibre stretcher', for example a piezoelectric or PZT fibre stretcher. In further alternative examples, the actuator may be a ground vibration source and may be mounted on, or at least partially implanted in the ground. Implanting an actuator can provide good acoustic coupling.

In general, therefore, the actuator may comprise hammer, thumper or other arrangement arranged to be movable to create an impact to impart vibrations into the fibre 102, directly or via an intermediate element such as a plate, train track or the like. Various other arrangements of acoustic sources may be used however and anything that creates a distinctive signal that can be detected by the DAS sensor could be used, including an acoustic transducer. The actuator may be controlled according to instructions provided by the processor 206, which may in turn hold, generate or receive instructions specifying the signal to be generated.

The actuator 118 is arranged to induce an acousto-mechanical signal in the fibre 102.

The fibre 102 can additionally be used to sense disturbances other than those produced by the actuator 118. To continue the example of FIG. 2, this may comprise a train on a portion of the train track 200, which may be spaced from the actuator 118. In such an example, the actuator 118 and the train would produce signals in different channels of the fibre 102.

The direction, speed, length and integrity (i.e. whether all cars are securely and correctly coupled together) and location of a moving train on the track 200 is detectable via the acoustic signal it induces in the fibre. The distance between vehicles (known as 'headway') can also be determined, as can the time and distance to fixed points (for example, a safety critical incident location). Indeed, it has been found that a particular vehicle can be identified through its acoustic signature, and this in turn can be monitored to detect changes such as deterioration. Characteristic acoustic 'signatures' may also be associated with signal types, i.e. there may be a characteristic of a signal which is indicative of faults such as wheel flats (misshapen portions of train wheels), hot axle boxes, or operation of trackside machinery such as points and barrier machines, along with generators, pumps and other machinery. Indeed, faults in such machinery may also have associated signatures, or departure from a particular signal pattern may itself be indicative of a fault.

In the context of track monitoring (although of course there could be analogous functions in other contexts), an interrogation unit 104 could be provided, for example, about every 50 km, perhaps capable of monitoring two fibres extending up to 25 km in either direction. A single actuator 118 may excite a portion (for example the end portions) of fibres 102 connected to different interrogation units 104. Alternatively or in addition to monitoring the position of vehicles on the track, apparatus could be provided to (i) detect unauthorised movement and/or activity trackside (this could address issues such as copper theft, vandalism and/or potential terrorist activity), (ii) safeguard trackside personnel (e.g. monitor location of authorised individuals such as work parties), (iii) safeguard public safety (e.g. monitoring unmanned level crossings, platforms, etc.) and/or (iv) monitor infrastructure (for example, detecting and generating alerts for rock fall, land slip, bridge and tunnel collapse/strike).

Many of these functions are safety critical and therefore it is desirable to know that sensing apparatus is functioning, and/or that it is functioning to a desired standard. In particular for safety critical applications, it may be desirable to detect apparatus failure rapidly.

For example, if a monitoring failure is detected, a system may enter a failsafe mode, which is certified as safe absent the failed monitoring apparatus. To consider one example, in railway signalling, a moving block signalling system identifies 'blocks' of safe track space around each train, allowing trains to be run closer together than it achievable using other systems. To operate as a moving block system, a railway operator needs a high degree of confidence that its train speed and train separation detectors are working properly. In the event of any failure, the system may revert to a 'fixed block' system, which may result in trains slowing down, or even stopping, while the spacing between trains is resolved (trains are generally further apart in a 'fixed block' mode, as only one train is permitted in each predetermined block of track at any one time).

An actuator 118 may be readily used to 'validate' the operational status of the length of fibre 102 between the actuator and the interrogation unit 104. An actuator 118 may be readily retrofitted to an existing fibre sensor apparatus.

In some examples, the apparatus 100 may be arranged such that the actuator 118 operates substantially continuously (or substantially continuously while the apparatus 100 is used to perform monitoring functions). Such an arrangement would continuously test the integrity of the fibre 102 and, in some examples, the performance of the interrogation unit 104, and could therefore quickly generate an alert in the event that the processing circuitry 114 is unable to positively confirm proper operation of the monitoring function. In some practical examples, the result of such an alert may be that the monitored system operates in a 'failsafe' mode.

The signal produced by the actuator 118 may be arranged for ease of detection. Providing such a signal may minimise the occurrence of 'false alarms'. Such a signal is preferably readily distinguishable from other sources of acoustic noise which may occur at the same channel of the apparatus 100 (for example having a different frequency signature or range to that of anticipated background or other signals), and/or may have at least a threshold strength. In some examples, the actuator signal may be able to apply different signals over time to test different 'virtual' sensors, i.e. different sensor functions. For example, it may be desirable to confirm the ability of the apparatus 100 to detect train speed and time, operation of trackside machinery and apparatus, specific configurations around level crossings or points, train length, etc., or any other sensor function of the apparatus. An anticipated signal may therefore be mimicked (or several signals mimicked in turn), or different actuators operated over a length of fibre to test such functions.

As such, the processor 206 may be arranged to control the actuator to produce an acoustic signal with has a characteristic amplitude and/or frequency, a characteristic varying amplitude and/or frequency, or may comprise a series of pulsed vibrations capable of providing a digital signal. In some examples, the signal may vary in a random or pseudo random manner. The test signal may be a repeating test signal. In some cases, providing a repeating test signal may assist with detectability and identification of the signal. The characteristics of the test signal may vary over time to test different monitoring functions.

Figure 3:
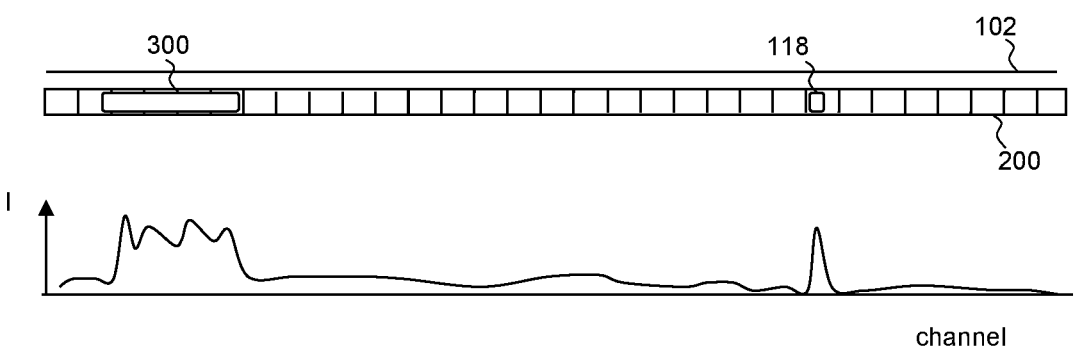
FIG. 3 shows and example of a monitored train track.

A particular example is now discussed with reference to FIG. 3 and the flow chart of FIG. 4. FIG. 3 shows an intensity signal produced in various channels of a fibre 102 arranged along a train track 200. The fibre 102 is excited in the region of the actuator 118, and also in the region of a train 300.

Figure 4:
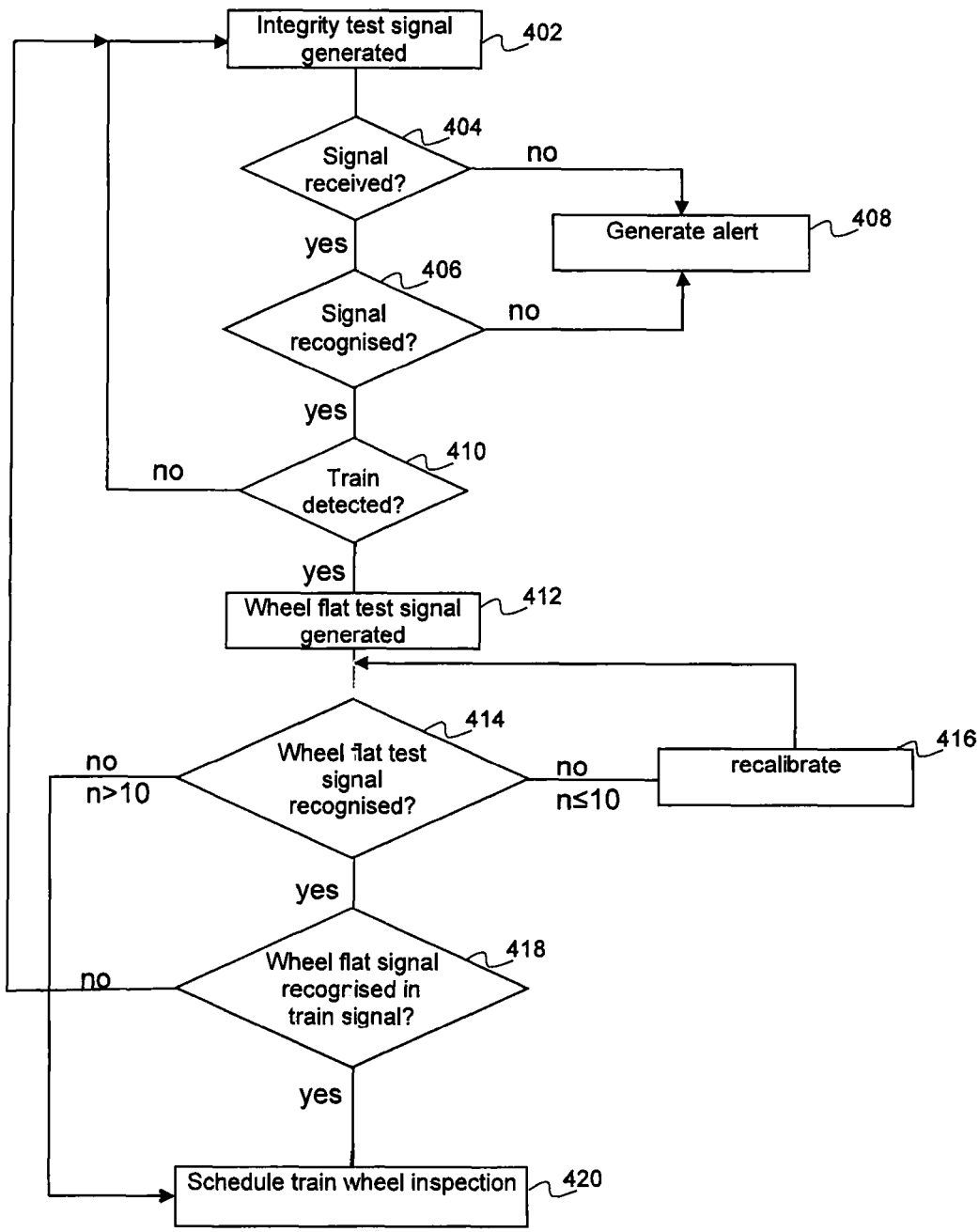
FIG. 4 is a flow chart showing an example of a method according to one embodiment of the present invention.

As set out in FIG. 4, in a first step, the actuator 118 is controlled to emit an 'integrity test' signal (block 402). The test signal comprises a continuous vibration with a predetermined repeated pattern being applied to the track 200 and is arranged to provide an indication of the operational status of the apparatus 100. To that end, in block 404, the interrogation unit verifies that an optical signal indicative of an acoustic signal is received from the portion of the fibre 102 which is near the actuator 118.

If a signal is received from the excited portion, an operator may have a high degree of confidence that the fibre sensor between the interrogation unit 104 and the actuator 118 is operational. In block 406, the signal detected is compared to an anticipated signal. If the signal is recognised (i.e. the signal detected by the interrogation unit 104 corresponds to the integrity test signal, having the predetermined repeated pattern), this allows an operator to have a high degree of confidence that the interrogation unit 104 is functioning correctly. The step of 'recognition' may also comprise an estimation of system noise, spectrum, latency, or any other indication of the system's operational characteristics.

If however, either a signal is not received from the portion of fibre 102 near the actuator 118, or the signal is not recognised, an alert is generated (block 408). This alert may result in the train system being operated in a 'failsafe' mode, e.g. reducing or stopping the movement of vehicles, and the like. This is because it can no longer be assumed that the apparatus 100 is operating as intended. The lack of a signal may be due to interrogation unit malfunction, sub-optimal operating parameters being used in interrogation unit 104, a break in the fibre 102, excessive system noise, a malfunctioning actuator 118 or for some other reason. However, in safety critical functions, a failsafe state may be assumed in the absence of an assurance of effective monitoring system. Such an alert may be triggered immediately, or following a period of time of failed detection, which could range from less than a second to minutes depending on the safety criticalness of operation.

In this example, the integrity test signal is applied until a train 300 is detected by another portion of the fibre 102.

When a train is detected by the interrogation unit 104 (block 410), the actuator 118 is controlled to change the test signal to one matching the signature for 'wheel flats' (block 412), i.e. a localised flattened region of a train wheel which may indicate that maintenance or replacement of a wheel should be carried out or scheduled.

The interrogation unit 104 then attempts to detect the 'wheel flat' in the optical signal (block 414). In this case, the interrogation unit 104 may have a number of 'signatures' of different signal types which relate to possible events, including fault events and safety critical events. These could include the presence of wheel flats and others such as signal box switching, trackside personal, rock falls, operational machinery, etc.

Whilst in the case of 'real' signals, the detection of any such signal could generate an alert, in the case of a test signal, it is the absence of signal recognition which is of concern. In this case, the optical signal from the exited portion of fibre 102 is compared to the stored signature and, if the signal is not recognised correctly, the interrogation unit 104 is recalibrated (block 416). This may comprise recalibrating any operational parameter. For example, the pulse width, pulse separation, pulse timing, detector sensitivity, detector gating signal, channel length (i.e. by changing the returned signal tin' size in the processing of the signal), or the like could be varied in isolation or in combination. In a particular example, the received signal may demonstrate a characteristic of 'signal wrapping' for signals mimicking wheel flats. This could result in the bin size being changed to reduce the sensitivity of the apparatus, reducing wrap, and increasing the ability of the apparatus 100 to detect wheel flats.

In this example, recalibration is attempted up to 10 times, although of course this number is simply by way of example. In other examples, recalibration may be carried out for a predetermined time period. If the interrogation unit 104 successfully indicates a 'wheel flat' for the location of the actuator 118, this indicates that it is correctly calibrated to detect such an event. Therefore, if, in block 418, it is determined that no 'wheel flat' signal is received from the location of the train 300, the operator may have a high degree of confidence that the train does not have a wheel flat, and the integrity test signal may be resumed. If however, the test signal is not recognised despite recalibration attempts, or if a wheel flat is detected in the signal produced by the train, a manual inspection of the train may be scheduled (block 420).

It will be understood that the present invention has been described above purely by way of example, and modification of detail can be made within the scope of the invention.

Although in some examples, a test signal may be applied continuously, in other examples, the integrity test signal may be applied periodically (for example, with a frequency related to the anticipated events and/or the level of assurance required given a particular set of facts).

An integrity test signal may be arranged to vary to test some or all intended monitoring functions. For example, a test signal designed specifically to trigger each of a plurality of safety critical alerts may be generated, and the failure to recognise any of these signals may trigger an alert state.

The signal may vary randomly for at least a portion of time. Such a signal may still have predetermined desired parameters, allowing it to be recognised. In some examples, the signal may vary pseudorandomly, according to a sequence which is known by the interrogation unit 104.

Each feature disclosed in the description, and (where appropriate) the claims and drawings may be provided independently or in any appropriate combination.

The invention claimed is:

1. A method of assessing at least one operational characteristic of a sensing apparatus comprising:
   interrogating an optical fibre with optical radiation;
   detecting optical radiation returned from a portion of an optical fibre which is excited by an acoustic test signal having at least one attribute of an anticipated signal, wherein the acoustic test signal comprises at least one of a variation in frequency or a variation in amplitude corresponding to the anticipated signal, and wherein the assessment module is configured to compare at least one characteristic derived from the detected optical signal from the excited portion to a signature characterising at least one acoustic signal or acoustic signal type, and wherein the interrogation unit is configured to recalibrate if the detected optical signal from the excited portion does not match at least one acoustic signal or acoustic type; and
   analysing the detected optical radiation from the excited portion to determine at least one operational characteristic of the sensing apparatus.

2. A method according to claim 1 in which the test signal has one or more known characteristics and the step of analysing comprises determining if the detected optical signal is indicative of an acoustic signal having at least one known characteristic of the test signal.

3. A method according to claim 1 which comprises determining if the determined characteristic meets at least one predetermined standard.

4. A method according to claim 3 comprising, if a determined characteristic does not meet at least one predetermined standard, changing at least one operational parameter of the sensing apparatus.

5. A method according to claim 1 in which the sensing apparatus is for use in monitoring a system and the test signal comprises at least one acoustic signal having at least one attribute of at least one anticipated acoustic signal for the system.

6. A method according to claim 5 in which at least one anticipated acoustic signal is a signal indicative of one or more of (i) a fault, or (ii) a safety critical scenario in the system.

7. A method according to claim 1 in which the step of analysing the detected signal comprises at least one of:
   determining if an acoustic signal has been received;
   comparing at least one characteristic of a detected signal to at least one characteristic based on the test signal; or
   comparing a detected signal to one or more characteristic based on a signal type.

8. A method according to claim 1 further comprising carrying out acoustic sensing for portions of the fibre other than the portion of the fibre which is excited by the acoustic test signal by detecting optical radiation returned from such other portions of the fibre.

9. A method according to claim 1 in which the test signal comprises at least one of (i) a characteristic amplitude and/or frequency, (ii) a characteristic varying amplitude and/or frequency, (iii) a series of pulsed vibrations capable of providing a digital signal, (iv) a pseudo random signal, or (v) a repeated sequence of acoustic impulses.

10. A method according to claim 1 which further comprises applying a test signal.

11. A method according to claim 10 which comprises varying at least one characteristic of the test signal over time.

12. A fibre sensing apparatus comprising:
    an interrogation unit to interrogate a sensing fibre with optical radiation, and to detect an optical signal returned from the fibre, and
    processing circuitry comprising an assessment module to analyse the optical signal returned from a portion of the fibre which is excited with an acoustic test signal having at least one attribute of an anticipated signal, and to determine at least one operational characteristic of the apparatus based on the detected optical signal;
    wherein the assessment module is configured to compare at least one characteristic derived from the detected optical signal from the excited portion to a signature characterising at least one acoustic signal or acoustic signal type;
    wherein the interrogation unit is configured to recalibrate if the detected optical signal from the excited portion does not match at least one acoustic signal or acoustic type; and
    wherein the acoustic test signal comprises at least one of a variation in frequency or a variation in amplitude corresponding to the anticipated signal.

13. Fibre sensing apparatus according to claim 12 further comprising:
    sensing fibre; and
    an actuator to excite the portion of the fibre with the acoustic test signal.

14. Fibre sensing apparatus according to claim 13 in which the assessment module is arranged to compare at least one characteristic derived from the detected optical signal from the excited portion to at least one predetermined characteristic.

15. Fibre sensing apparatus according to claim 14 in which the assessment module is arranged to compare at least one characteristic of the detected optical signal from the excited portion to one or more characteristics derived from an actuator test signal.

16. Fibre sensing apparatus according to claim 13 in which the actuator comprises a vibrational acoustic source.

17. Fibre sensing apparatus according to claim 13 in which the actuator comprises a controller arranged to control the acoustic signal generated thereby.

18. Fibre sensing apparatus according to claim 12 in which the operational characteristic is at least one of:
   an indication that the sensing apparatus is functional; or
   an indication that the sensing apparatus is non functional.

19. Fibre sensing apparatus according to claim 12 in which the operational characteristic is at least one of:
   an indication of the sensitivity of the apparatus over at least one operational range; or
   an indication of the calibration of the apparatus.

20. Fibre sensing apparatus according to claim 12 in which the assessment module is arranged to analyse the signal detected and, based on the analysis, optimize interrogation unit performance over one or more operational range.

21. Fibre sensing apparatus according to claim 12 in which the assessment module is arranged to analyse the signal detected and, if a determined characteristic does not meet at least one predetermined standard, the apparatus is arranged to vary at least one operational parameter based on the analysis.

22. Fibre sensing apparatus according to claim 12 in which the assessment module is arranged to produce an output indicative of at least one operational characteristic.

23. Fibre sensing apparatus according to claim 12 in which the processing circuitry further comprises an alert module, and, if the determined operational characteristic(s) do not meet a predetermined standard, the alert module is arranged to produce an alert.

24. Fibre sensing apparatus according to claim 12 in which the interrogation unit is arranged to carry out sensing in relation to other fibre portions.

25. Fibre sensing apparatus according to claim 12 which comprises a Distributed Acoustic Sensor (DAS).

\* \* \* \* \*